(12) United States Patent
Lei et al.

(10) Patent No.: US 10,231,893 B2
(45) Date of Patent: Mar. 19, 2019

(54) SMART WEARABLE DEVICE

(71) Applicant: BOE TECHNOLOGY GROUP CO., LTD., Beijing (CN)

(72) Inventors: Liping Lei, Beijing (CN); Jie Lin, Beijing (CN); Xuewen Lv, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 3 days.

(21) Appl. No.: 15/262,269

(22) Filed: Sep. 12, 2016

(65) Prior Publication Data
US 2017/0202722 A1    Jul. 20, 2017

(30) Foreign Application Priority Data

Jan. 18, 2016  (CN) ............ 2016 1 0032585

(51) Int. Cl.
*G02C 11/00* (2006.01)
*A61H 1/00* (2006.01)
(Continued)

(52) U.S. Cl.
CPC ............ *A61H 1/008* (2013.01); *A61H 7/001* (2013.01); *A61H 23/004* (2013.01); *G02B 27/0176* (2013.01); *G02C 5/008* (2013.01); *G02C 11/00* (2013.01); *G09G 3/003* (2013.01); *A61H 2201/0119* (2013.01); *A61H 2201/0192* (2013.01); *A61H 2201/10* (2013.01); *A61H 2201/1604* (2013.01); *A61H 2201/165* (2013.01); *A61H 2201/1607* (2013.01); *A61H 2201/50* (2013.01); *A61H 2201/5043* (2013.01);
(Continued)

(58) Field of Classification Search
None
See application file for complete search history.

(56) References Cited

U.S. PATENT DOCUMENTS 3,478,736 A * 11/1969 Roberts .............. A61H 23/0254
601/62
4,841,954 A *  6/1989 Kalsi .................. A61H 23/0263
601/71
(Continued)

FOREIGN PATENT DOCUMENTS

CN        201707500 U      1/2011
CN        201796190 U *    4/2011
(Continued)

OTHER PUBLICATIONS

Complete machine translation of CN 201707500 U (Jan. 12, 2011, Yang et al.—Oct. 11, 2016 IDS reference), 7 pgs.*
(Continued)

*Primary Examiner* — Srilakshmi K Kumar
*Assistant Examiner* — K. Kiyabu
(74) *Attorney, Agent, or Firm* — Brooks Kushman P.C.

(57) ABSTRACT

The present disclosure relates to the field of display technology, and in particular, to a smart wearable device. The smart wearable device comprises a glasses body, an auxiliary frame for its user to wear on the head, and a massage apparatus for the user to massage the head; the glasses body comprising a smart display means and glasses legs carrying the smart display means; both ends of the auxiliary frame being connected to the glasses legs, respectively.

14 Claims, 3 Drawing Sheets

(51) Int. Cl.
  *G02B 27/01*  (2006.01)
  *G02C 5/00*  (2006.01)
  *G09G 3/00*  (2006.01)
  *A61H 23/00*  (2006.01)
  *A61H 7/00*  (2006.01)

(52) U.S. Cl.
  CPC .............. *A61H 2205/021* (2013.01); *G02B 2027/0178* (2013.01)

(56) References Cited

U.S. PATENT DOCUMENTS

| | | | | |
|---|---|---|---|---|
| 4,920,466 | A * | 4/1990 | Liu | A61H 23/0263 362/105 |
| 5,115,769 | A * | 5/1992 | Fiorini | A61H 23/0263 601/71 |
| 5,245,989 | A * | 9/1993 | Simon | A61H 7/006 601/108 |
| 5,486,156 | A * | 1/1996 | Takach | A61H 23/0263 601/46 |
| 5,611,771 | A * | 3/1997 | Taylor | A61H 23/0263 601/48 |
| 6,132,392 | A * | 10/2000 | Stone | A61H 1/0218 601/103 |
| 6,142,623 | A * | 11/2000 | Jones | G02C 3/003 351/155 |
| 6,530,660 | B1 * | 3/2003 | Chao | G02C 5/006 16/228 |
| 6,638,295 | B1 * | 10/2003 | Schroer | A61H 39/04 601/70 |
| 9,539,170 | B1 * | 1/2017 | Adaie | A61H 23/0254 |
| 2002/0092138 | A1 * | 7/2002 | Spiller | A01K 27/001 24/306 |
| 2004/0041336 | A1 * | 3/2004 | Kobayashi | B65H 3/54 271/170 |
| 2006/0122545 | A1 * | 6/2006 | Terui | A61H 7/001 601/72 |
| 2006/0135890 | A1 * | 6/2006 | Tsai | A61H 5/00 601/15 |
| 2007/0213646 | A1 * | 9/2007 | Han | A47G 9/1045 601/57 |
| 2009/0195479 | A1 * | 8/2009 | Kato | H04R 1/028 345/8 |
| 2010/0122410 | A1 * | 5/2010 | Gourdin | A61H 35/00 4/618 |
| 2010/0149764 | A1 * | 6/2010 | Ueyama | G06F 1/1681 361/749 |
| 2011/0234971 | A1 * | 9/2011 | Yeh | A61H 7/001 351/111 |
| 2011/0296575 | A1 * | 12/2011 | Shaw | A61F 9/025 2/15 |
| 2012/0235886 | A1 * | 9/2012 | Border | G02B 27/0093 345/8 |
| 2013/0346168 | A1 * | 12/2013 | Zhou | G06F 1/163 705/14.4 |
| 2015/0343189 | A1 * | 12/2015 | Ostrovsky | A61N 1/0456 601/46 |
| 2016/0011421 | A1 * | 1/2016 | Kim | G02B 27/0172 345/8 |
| 2016/0034032 | A1 * | 2/2016 | Jeong | G06F 3/013 345/156 |
| 2016/0282627 | A1 * | 9/2016 | Hiraide | G02B 27/0176 |
| 2016/0317381 | A1 * | 11/2016 | Long | A61F 9/04 |
| 2017/0139235 | A1 * | 5/2017 | Liu | G02C 11/00 |
| 2018/0120594 | A1 * | 5/2018 | Li | G02C 11/10 |

FOREIGN PATENT DOCUMENTS

| | | | |
|---|---|---|---|
| CN | 202476771 U | | 10/2012 |
| CN | 203149210 U | | 8/2013 |
| CN | 103271504 A | * | 9/2013 |
| CN | 203882022 U | * | 10/2014 |
| CN | 204903879 U | | 12/2015 |
| CN | 205301717 U | | 6/2016 |
| CN | 205321404 U | * | 6/2016 |
| CN | 205982865 U | * | 2/2017 |
| JP | 2009003335 A | * | 1/2009 |

OTHER PUBLICATIONS

Complete machine translation of CN 202476771 U (Oct. 10, 2012, Tang—Oct. 11, 2016 IDS reference), 4 pgs.*
Complete machine translation of CN 203149210 U (Aug. 21, 2013, Liu et al.—Oct. 11, 2016 IDS reference), 8 pgs.*
Chinese First Office Action for Chinese Application No. 201610032585.4, dated Jul. 28, 2016, 6 Pages.

* cited by examiner

--Related Art--

SMART WEARABLE DEVICE

CROSS-REFERENCE TO RELATED APPLICATIONS

This application claims priority to Chinese application No. 201610032585.4, filed Jan. 18, 2016, which is hereby incorporated by reference in its entirety.

TECHNICAL FIELD

The present disclosure relates to the field of display technology, and in particular, to a smart wearable device.

BACKGROUND

Currently, head-mounted wearable devices (such as smart glasses) have been developed rapidly, and products thereof have mushroomed continually.

Google has introduced a type of smart glasses. The disadvantage of this type of smart glasses is that only one eye can view images, and wearing the glasses for a long time results in different intraocular pressure in both eyes, leading to eye fatigue. In addition, Epson has also introduced a type of head-mounted display. Although this head-mounted display has two lenses, due to the integration of a large number of functions on its frame, the entire glasses are heavy, squeezing the user's nose and resulting in fatigue.

Since a large number of functions are integrated on the frame of the smart glasses in the related art, the entire glasses are heavy, squeezing the user's nose and becoming unbearable to the user. Moreover, wearing the smart glasses abovementioned for a long time will lead to fatigue, making people uncomfortable.

SUMMARY (I) Technical Problem to Solve

The technical problem to be solved by the present disclosure is the problem that the smart glasses in the related art squeeze the user's nose and wearing for a long time will make the head uncomfortable.

(II) Technical Solution

To solve the above technical problem, the present disclosure provides a smart wearable device, comprising a glasses body, an auxiliary frame for its user to wear on the head, and a massage apparatus for the user to massage the head; the glasses body comprising a smart display means and glasses legs carrying the smart display means; both ends of the auxiliary frame being connected to the glasses legs; the massage apparatus being provided on the auxiliary frame.

Wherein the glasses body comprises two lenses independently provided;

no nose pad component is provided between the two lenses;

each of the lens is connected to the corresponding glasses leg respectively.

Wherein the glasses body comprises two lenses connected;

a nose pad component is provided between the two lenses;

each of the lens is connected to the corresponding glasses leg respectively.

Wherein the nose pad component comprises two nose pads connected to a driver; the driver is used for driving the two nose pads to flip toward the outside of the lens, away from the inside of the lens.

Wherein the auxiliary frame is a retractable semi-arc frame.

Wherein the two ends of the auxiliary frame are flexibly connected to the glasses legs.

Wherein a hinge member is provided between the two ends of the auxiliary frame and the glasses legs, respectively, and the auxiliary frame flips via the hinge member, taking the connecting line of the hinge members as the axis.

Wherein a stopper is further provided between the ends of the auxiliary frame and the glasses legs, respectively, and the stopper is used for fixing the auxiliary frame to a predetermined flip position.

Wherein the ends of the auxiliary frame are fixedly connected to the glasses legs.

Wherein the auxiliary frame is made of an elastic plastic or metal shrapnel.

Wherein the massage apparatus comprises a plurality of massaging keys provided on the inner side of the auxiliary frame; the massaging keys are of convex shape and are elastically stretchable along the convex direction.

Wherein the ends of the massaging keys are with arcuate surface and the arcuate surfaces of the plurality of massaging keys are on the same sphere.

Wherein the interior of the massaging key is inlaid with a magnetic structure for user magnetic massage.

Wherein the auxiliary frame is a flat strap structure surrounded by an inner layer and an outer layer; a hollow cavity is formed between the inner layer and the outer layer of the auxiliary frame, and a plurality of mounting holes are provided on the inner layer of the auxiliary frame; one end of the massaging key is provided within the hollow cavity and is connected to the outer layer of the auxiliary frame via an elastic member, and the other end of the massaging key can protrude from the mounting hole under the elastic force of the elastic member.

Wherein the inner and outer layers of the auxiliary frame relatively move after being squeezed by an external force; the inner and outer layers of the auxiliary frame bounce to restore under the action of the elastic force thereof therebetween.

Wherein the plurality of massaging keys is arranged in one or more rows, the massaging keys in each row are arranged at the same interval.

Wherein the smart display means comprises a processor and an image processing unit, a voice processing unit and a projection display in communication with the processor, the processor transfers video information, voice information to the projection display via the image processing unit, the voice processing unit, respectively, to form a video image via the projection display for users to watch.

Wherein the glasses body comprises two 3D lens, one for transmitting blue light, the other for transmitting red light.

Wherein, the auxiliary frame is provided with a static electricity elimination device.

Wherein the auxiliary frame is provided with a negative ion generator.

(III) Beneficial Effects

The technical solution of the present disclosure described hereinabove has the following beneficial effects: with the auxiliary frame additionally provided on the smart glasses, the smart wearable device of the present disclosure cooperates with the glasses legs to play the role of supporting and fixing, so that there is no need to provide a clamping means for nose, thereby removing the squeezing on the user's nose.

At the same time, the user head is massaged by the massage apparatus, improving the overall wearing comfort.

Wherein, 1: Auxiliary Frame; 2: Massaging Key; 3: Lens; 4: Hinge Member; 5: Glasses Leg; 6: Nose Pad Component; 7: Driver; 8: Stopper; 9: Magnetic Structure; 10: Mounting Hole; 11: Trackpad; 12: Camera; 13: Microphone; 14: Projection Display; 15: Built-in Control Module; 16: Elastic Member; 17: Static Electivity Elimination Device; 18: Negative Ion Generator; 19: Smart Display Device; 19A: Processor; 19B: Image Processing Unit; 19C: Voice Processing Unit; 19D: Projection Display.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The way to carry out the present disclosure will be described below in further detail in conjunction with the accompanying drawings and the following embodiments. The following embodiments serve to illustrate the present disclosure, but not to limit the scope of the present disclosure.

In the description of the present disclosure, it should be noted that, unless otherwise specified, "a plurality" means two or more; the orientation or positional relationship indicated by the term "upper", "lower", "left", "right", "within", "outside", "front end", "rear end", "beginning", or "end" is based on the drawings, for convenience of description of the present disclosure and simplifying the description, rather than indicating or implying that the device or element referred to must have a particular orientation, is constructed and operates in a particular orientation, and therefore cannot be construed as limiting the present disclosure. Furthermore, the terms "first", "second", "third", etc. are used for descriptive purpose only, not to be construed to indicate or imply relative importance.

In the description of the present disclosure, it is also important to note that, unless otherwise clearly defined and limited, the term "mounted", "attached", or "connected" is to be broadly understood, for example, it may refer to a fixed connection, may also be a removable connection, or an integral connection; it may refer to a mechanical connection, and may also be an electrical connection; it can be a direct connection, and may also be an indirect connection through an intermediate medium. Those of ordinary skill in the art may understand the specific meaning of the above terms in the present disclosure taking account of the specific circumstances.

Figure 1:
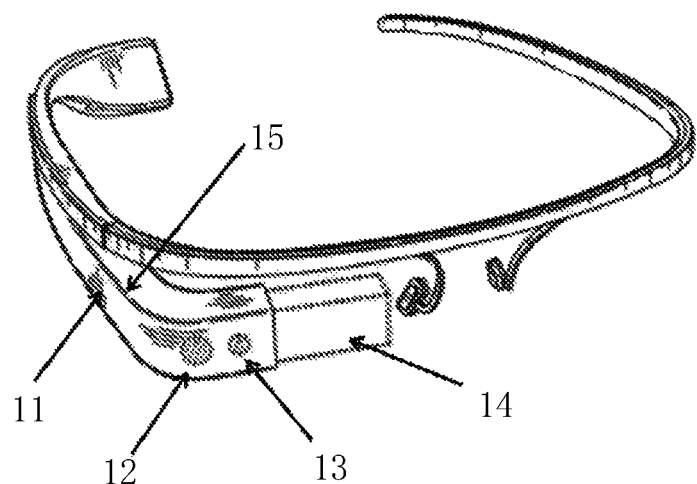
FIG. 1 is a schematic view of the structure of smart glasses in the related art.

Google has introduced a type of smart glasses. As shown in FIG. 1, the smart glasses are provided with a head-mounted display system and a camera 12 in the vicinity of the right-eye, the head-mounted display system comprising a touch pad 11, a microphone 13, a projection display 14 and a built-in control module 15 and other various kinds of smart modules, finally projects an image directly onto the eyeball via some kinds of smart display modules, and implements search, text messaging, camera and other functions using the virtual reality technology. However, the disadvantage of this type of smart glasses is that, only one eye can view the image, and wearing for a long time will result in different intraocular pressure in both eyes, leading to eye fatigue.

Figure 2:
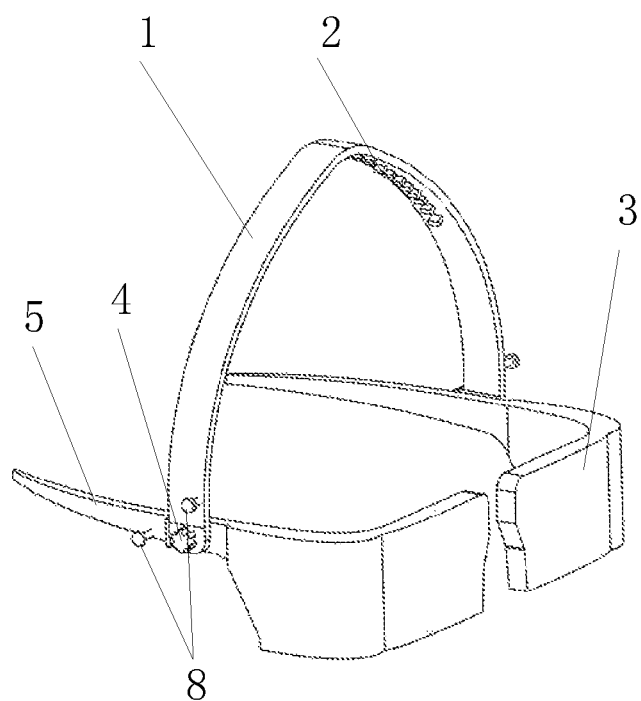
FIG. 2 is a schematic view of the structure of a smart wearable device of embodiments of the present disclosure.

As shown in FIG. 2, the smart wearable device provided in some embodiments of the present disclosure comprises a glasses body, an auxiliary frame 1 for its user to wear on the head, and a massage apparatus for the user to massage the head; the glasses body comprises a smart display means and glasses legs 5 carrying the smart display means; two ends of the auxiliary frame 1 are connected to the glasses legs 5, respectively, and by being worn on the head, can reduce the pressure on the nose muscle; while the massage apparatus is provided on the auxiliary frame 1, implementing the massage on the user's head and improving the overall wearing comfort.

The glasses body in some embodiments of the present disclosure comprises two lenses 3 independently provided, the two lenses 3 being not connected therebetween; no nose pad component 6 is provided between the two lenses 3, only a tapered space is provided for avoiding the nose portion, thus completely removing the pressure from the glasses. Of course, each lens 3 is also connected to the corresponding glasses leg 5. This connection is not limited to some particular form, but can be provided flexibly according to actual needs, for example: each lens 3 can be fixedly connected to the corresponding glasses leg 5, respectively, to increase its stability; or, through each lens 3 is removably connected to the glasses leg 5 via an adjusting member for convenience of replacement.

The auxiliary frame 1 in some embodiments of the present disclosure can be seen as a headband structure, made of elastic plastic or metal shrapnel. Wherein the elastic plastic has light weight, no harm to skin, tight fit to the user's head and other features. The metal shrapnel has strong stability and durability. Of course, two materials may also be used in combination, namely, an elastic plastic layer is formed on the inner surface of the metal shrapnel, thereby having the advantages of both materials.

Further, the auxiliary frame 1 may also be a semi-arc arc-shaped frame retractable. Such retractable adjustment may be implemented using a plug, elastic stretching or sliding member. In one preferred way, the auxiliary frame 1 is divided into a left half part and a right half part, and the left half part and the right half part are inserted in a sleeve respectively and can be retractably adjusted in a stretching way according to the shape of the head. Or, an elastic stretching member is provided between the left half part and the right half part to implement retractable adjustment through the stretching elasticity. Or the left half part and the right half part partially overlap, and a sliding member is provided between the overlapping portions to drive the both to slide, whereby the retractable adjustment can be implemented. As it can be seen, such retractable adjustment manner may be in various forms and can be selected flexibility according to actual needs.

Furthermore, there are two ways to connect the ends of the auxiliary frame 1 and the glasses legs 5.

Among them, one way is that the ends of the auxiliary frame 1 are movably connected to the glasses legs 5. A hinge member 4, such as a hinge shaft, is provided between the ends of the auxiliary frame 1 and the glasses legs 5. The auxiliary frames 1 flips between the front and rear ends of the glasses body via the hinge member 4. Moreover, a stopper 8 is also provided between the ends of the auxiliary frame 1 and the glasses legs 5, for fixing the auxiliary frame 1 to a predetermined flipping position (which can be a pre-set position, also may be a position suitable for the head to wear, and functions to implement the fixing of the auxiliary frame 1 in a suitable position).

Specifically, in order to facilitate the user in wearing the glasses, the auxiliary frame 1 and the glasses legs 5 are hinged movably. Before the user is wearing the glasses, the auxiliary frame 1 is first rotated to a first position (e.g., rotated to the front of the lens 3), without affecting wearing the glasses. After the user rests the glasses legs 5 on the ears, the auxiliary frame 1 may be rotated to a second position (e.g., on top of the head), so that the glasses legs 5 and the auxiliary frame 1 are placed in suitable positions, respectively. In order to ensure that the auxiliary frame 1 does not shift freely after being in the second position, a stopper is also provided between the auxiliary frame 1 and the glasses legs 5, for operating the stopper to an appropriate position when the auxiliary frame 1 is placed in the second position, to fix the relative positions of the glasses legs 5 and the auxiliary frame 1.

Among them, the other way is that the ends of the auxiliary frame 1 are fixedly connected to the glasses legs 5. It is ok as long as such a fixed connection can meet that they may be worn on the user's head, for example: when the auxiliary frame 1 is of elastic plastic material, the ends of the auxiliary frame 1 can be fixed onto the glasses legs 5. Of course, it is required that the position to fix may be designed beforehand according to the specific head shape.

The massage apparatus in some embodiments of the present disclosure comprises a plurality of massaging keys 2 provided inside of the auxiliary frame 1; the plurality of massaging keys 2 is arranged in one or more rows, and the massaging keys in each row are arranged at the same interval. The massaging keys 2 are of convex shape and are elastically stretchable along the convex direction, that is, the massaging keys 2 move up and down along the direction of length, to achieve a better massage effect.

Alternatively, the ends of each massaging key 2 are with arcuate surface and the arcuate surfaces of the plurality of massaging keys 2 are on the same sphere. In this way, they fit the shape of a human head. The arcuate surface better fits a human head, and with the guide fillet, becomes safer after the acute angle being removed, allowing the user to feel comfortable.

Moreover, the interior of the massaging key 2 is inlaid with a magnetic structure 9 for user magnetic massage. This magnetic structure may be a magnet, a magnetic bead or a magnetic sheet. In application, the magnetic structure corresponds to the head or the temple position, and can play the role of physical massage and magnetic therapy, while the user can keep excited when experiencing the video effects, relieving fatigue.

Figure 4:
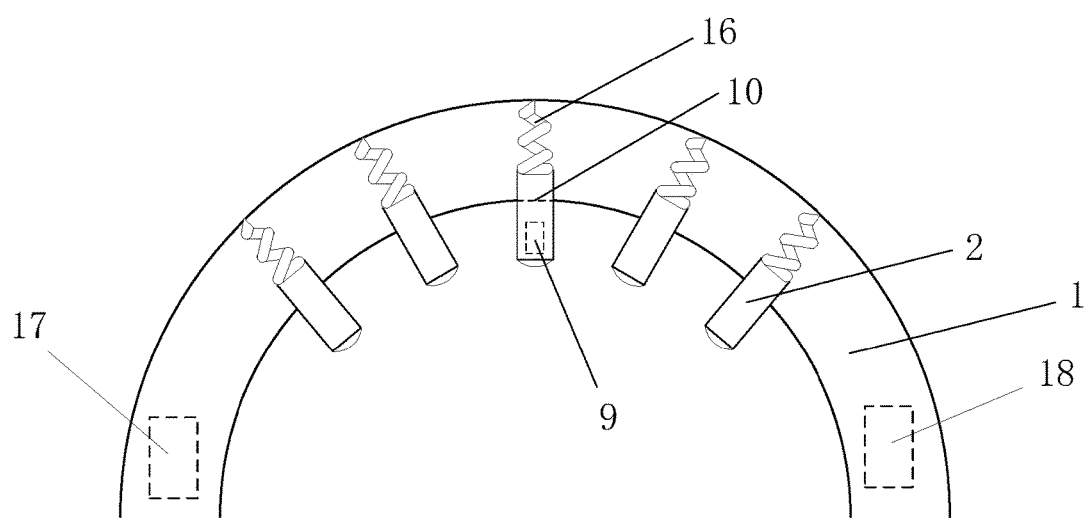
FIG. 4 is a sectional view of an auxiliary frame of a smart wearable device of embodiments of the present disclosure.

Further, in some embodiments of the present disclosure, as shown in FIG. 4, the auxiliary frame 1 is a flat strap structure surrounded by an inner layer and an outer layer; a hollow cavity is formed between the inner layer and the outer layer of the auxiliary frame 1, and a plurality of mounting holes 10 are provided on the inner layer of the auxiliary frame 1; one end of the massaging key 2 is provided within the hollow cavity and is connected to the outer layer of the auxiliary frame 1 via an elastic member, and the other end of the massaging key 2 can protrude from the mounting hole under the elastic force of the elastic member. Preferably, the elastic member is a spring.

Specifically, the auxiliary frame 1 is set to be a hollow two-layer structure, namely, the inner and outer layers. The inner and outer layers of the auxiliary frame 1 relatively move (toward each other) after being squeezed by an external force; with the pressure relieved, the inner and outer layers of the auxiliary frame 1 bounce to restore under the action of the elastic force thereof therebetween. That is, the distance between the inner and outer layers can be elastically lengthened or shortened, and the user manually presses the outer layer to move toward the inner layer and bounce when the user removes the hand. Meanwhile, the inner layer of the auxiliary frame 1 is provided with a plurality of holes mating with the sectional surfaces of the massaging keys 2, the heads of the massaging keys 2 may protrude out from the hollow cavity, and the massaging key 2 and the tail relative to its head are provided with a spring structure. One end of the spring structure is provided in the tail of the massaging key 2, the both being fixedly connected; the other end of the spring structure is provided on the outer layer, the both being fixedly connected. When the outer layer moves toward the inner layer, the spring connected to every massaging key 2 is driven to move toward the inner layer, and the massaging key 2 will move outward along with the spring, to achieve the massaging function on the user's head.

Figure 5:
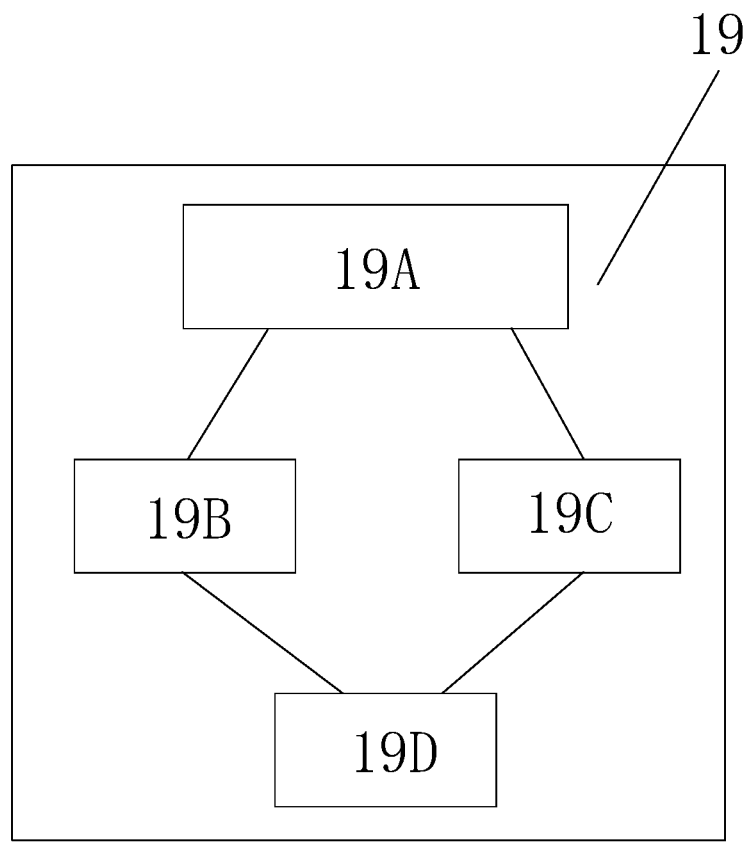
FIG. 5 is a schematic view of the structure of a smart display means of a smart wearable device of embodiments of the present disclosure.

As shown in FIG. 5, the smart display means 19 in some embodiments of the present disclosure comprises a processor 19A and an image processing unit 19B in communication with the processor, a voice processing unit 19C, and a projection display 19D, the processor transferring video information, voice information to the projection display via the image processing unit, the voice processing unit, respectively, to form a video image via the projection display for users to watch. The principle is to use virtual display technology, and may employ the structure of the smart glasses in the related art.

Of course, in order to reflect the man-machine interaction function more, the processor may be provided with a USB port and a memory card slot, etc., and may also be provided with a communication module, a search processing unit, various sensors, a gyroscope and other functional modules. There is no limitation here.

In summary, in some embodiments of the present disclosure, with the auxiliary frame additionally provided on the smart glasses to support and fix, together with the glasses legs, the position of the smart glasses, there is no need to provide a clamping means on the smart glasses for nose, thereby removing the squeezing on the user's nose. At the same time, the user head is massaged by the massage apparatus, improving the overall wearing comfort.

Figure 3:
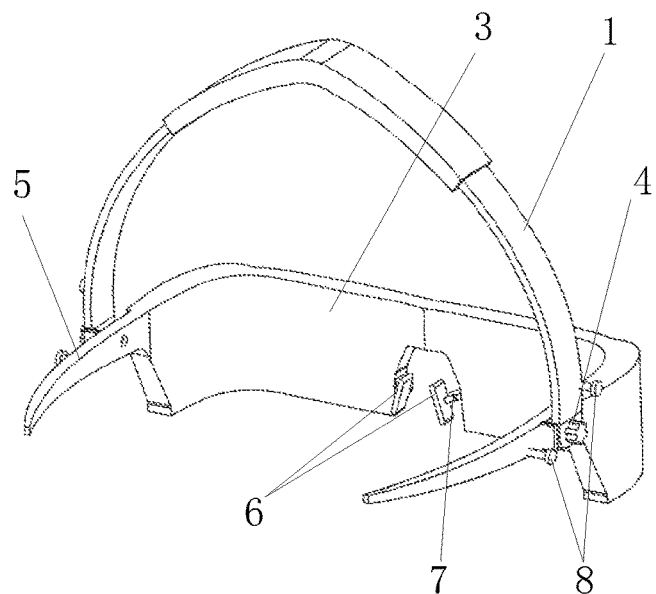
FIG. 3 is a schematic view of the structure of a smart wearable device of embodiments of the present disclosure.

As shown in FIG. 3, in some embodiments of the present disclosure, the glasses body comprises two connected 3D lens, between which two 3D lens there is provided a nose pad component 6. At the same time, each lens 3 is connected to the corresponding to glasses leg 5, respectively, which such connection is not limited to some particular form and can be set flexibly according to actual needs. In addition to the above-described two connection ways described in the embodiments (a fixed connection or a removable connection), another adjustable connection can also be used, for example, the lens 3 are movably hinged with the glasses legs 5, and may flip up and down. Moreover, the two lenses 3 can also be connected therebetween via an adjusting member, to adjust the distance between the two lenses 3, to meet the needs of different people.

Further, the nose pad component 6 comprises two nose pads connected to a driver 7; the driver is for driving the two nose pads to flip outward, away from the inside of the lens 3. When the user uses the auxiliary frame 1 for wearing on the head, the nose pads may be driven by the driver to move outwardly away from the nose bridge, so as not to contact with the nose bridge, reducing the squeezing on the nose muscle. When the user is not using the auxiliary frame 1, the nose pad component 6 may be used again for auxiliary support; as it can be seen, such glasses in some embodiment of the present disclosure have dual effects.

In addition, in some embodiments of the present disclosure, some other functional deformations may also be done, and will be described below in the following embodiments.

First, the glasses may also be smart 3D glasses, the glasses body comprising two 3D lenses, wherein one 3D lens is for transmitting blue light, and the other 3D lens is for transmitting red light, while the 3D video image formed by the smart display means forms a 3D picture on the human eye after passing through the 3D lens.

Second, as shown in FIG. 4, in order to prevent the generation of static electricity between the auxiliary frame 1 and the hair, a static electricity elimination device may be provided on the auxiliary frame 1, for example: some metal wires are provided on the auxiliary frame 1, to eliminate static electricity.

Third, as shown in FIG. 4, in order to slow down aging and increase metabolism, a negative ion generator 18 may also be provided on the auxiliary frame 1, the principle of which is to utilize tip DC high voltage to produce high corona and release in high speed a large number of electrons, while an electron cannot exist in the air for a long time and will be immediately captured by oxygen molecules in the air to generate air negative ions. Experimental studies show that: eco-level small-size negative oxygen ions can transmit through the human blood-brain barrier more easily, and play a role of health care.

The embodiments of the present disclosure are given for illustrative and descriptive purposes, but not exhaustive or limiting the present disclosure to the form disclosed. Many modifications and variations are obvious to those of ordinary skill in the art. Embodiments are chosen and described in order to better explain the principles and practical applications of the present disclosure, and enable those of ordinary skill in the art to understand the present disclosure and thus design various embodiments with various modifications suitable for a particular purpose.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A smart wearable device, comprising a glasses body, an auxiliary frame for a user to wear the smart wearable device on a head of the user and a massage apparatus for the user to massage the head;

wherein the glasses body comprises a smart display apparatus and glasses legs carrying the smart display apparatus;

two ends of the auxiliary frame are connected to the glasses legs respectively; and the massage apparatus is provided on the auxiliary frame;

wherein the glasses body comprises two lenses connected to each other;

a nose pad component is provided between the two lenses; and each of the two lenses is connected to the corresponding glasses leg;

wherein the nose pad component comprises two nose pads connected to drivers; and the drivers are configured to drive each of the two nose pads to move toward an outside of a respective one of the lenses, to move the two nose pads away from an inside of the respective one of the lenses;

wherein the two ends of the auxiliary frame are movably connected to the glasses legs, a hinge member is provided between each of the two ends of the auxiliary frame and the corresponding glasses leg, and the auxiliary frame flips via the hinge members, with a connecting line of the hinge members as an axis;

stopper is configured to fix the auxiliary frame to a predetermined flip position;

wherein the stopper is independent from the hinge member and comprises two projecture members arranged respectively on the auxiliary frame and the glasses leg, each projecture member comprises a head and a neck, and an area of an orthographic projection of the head onto the glass leg is larger than an area of an orthographic projection of the neck onto the glass leg;

wherein the massage apparatus comprises a plurality of massaging keys provided on an inner side of the auxiliary frame; and each of the massaging keys is of a convex shape and is elastically stretchable along a protruding direction of the massaging key;

wherein the auxiliary frame is of a flat and strip-like structure formed by an inside layer and an outside layer;

the auxiliary frame is hollow, and a plurality of mounting holes is provided on the inside layer of the auxiliary frame; and one end of each of the massaging keys is provided within the auxiliary frame and is connected to the outside layer of the auxiliary frame via an elastic member, and the other end of the massaging key protrudes through the mounting hole under an elastic force of the elastic member.

2. The smart wearable device according to claim 1, wherein the auxiliary frame is a retractable semi-arc frame.

3. The smart wearable device according to claim 2, wherein the ends of the auxiliary frame are fixedly connected to the glasses legs.

4. The smart wearable device according to claim 1, wherein the auxiliary frame is made of an elastic plastic or metal shrapnel.

5. The smart wearable device according to claim 1, wherein an end surface of each of the massaging keys is an arc and the end surfaces of the massaging keys are on a same sphere surface.

6. The smart wearable device according to claim 1, wherein a magnetic structure providing a magnetic medical massaging for the user is arranged in each of the massaging key.

7. The smart wearable device according to claim 1, wherein the inside and outside layers of the auxiliary frame move relative to each other after being squeezed by an external force; and the inside and outside layers of the auxiliary frame bounce to restore under the elastic force thereof therebetween.

8. The smart wearable device according to claim 1, wherein the plurality of massaging keys is arranged in one or more rows, and the massaging keys in each row are arranged at an identical interval.

9. The smart wearable device according to claim 1, wherein the smart display apparatus comprises a processor, an image processing unit, a voice processing unit and a projection display in communication with the processor, and the processor transfers video information and voice information to the projection display via the image processing unit and the voice processing unit, respectively, so as to form a video image via the projection display.

10. The smart wearable device according to claim 1, wherein the lenses comprise 3D lenses, and one of the 3D lenses is configured to allow blue light to be transmitted therethrough, the other is configured to allow red light to be transmitted therethrough.

11. The smart wearable device according to claim 1, wherein the auxiliary frame is provided with a static electricity elimination device.

12. The smart wearable device according to claim 1, wherein the auxiliary frame is provided with a negative ion generator.

13. The smart wearable device according to claim 1, wherein the projecture member arranged on the glasses leg is arranged at a side of the corresponding hinge member away from the lens.

14. A smart wearable device, comprising a glasses body, an auxiliary frame for a user to wear the smart wearable device on a head of the user and a massage apparatus for the user to massage the head;
wherein the glasses body comprises a smart display apparatus and glasses legs carrying the smart display apparatus;
two ends of the auxiliary frame are connected to the glasses legs respectively; and
the massage apparatus is provided on the auxiliary frame;
wherein the glasses body comprises two lenses separated from each other, and each of the two lenses is fixed to the corresponding glasses leg;
wherein the two ends of the auxiliary frame are movably connected to the glasses legs, a hinge member is provided between each of the two ends of the auxiliary frame and the corresponding glasses leg, and the auxiliary frame flips via the hinge members, with a connecting line of the hinge members as an axis;
a stopper is configured to fix the auxiliary frame to a predetermined flip position;
wherein the stopper is independent from the hinge member and comprises two projecture members arranged respectively on the auxiliary frame and the glasses leg, each projecture member comprises a head and a neck, and an area of an orthographic projection of the head onto the glass leg is larger than an area of an orthographic projection of the neck onto the glass leg;
wherein the massage apparatus comprises a plurality of massaging keys provided on an inner side of the auxiliary frame; and each of the massaging keys is of a convex shape and is elastically stretchable along a protruding direction of the massaging key;
wherein the auxiliary frame is of a flat and strip-like structure formed by an inside layer and an outside layer;
the auxiliary frame is hollow, and a plurality of mounting holes is provided on the inside layer of the auxiliary frame; and
one end of each of the massaging keys is provided within the auxiliary frame and is connected to the outside layer of the auxiliary frame via an elastic member, and the other end of the massaging key protrudes through the mounting hole under an elastic force of the elastic member.

* * * * *